(12) United States Patent
Marinov et al.

(10) Patent No.: US 12,197,639 B2
(45) Date of Patent: *Jan. 14, 2025

(54) CONFORMAL DISPLAY SYSTEM AND A METHOD THEREOF

(71) Applicant: ELBIT SYSTEMS LTD., Haifa (IL)

(72) Inventors: Ofer Marinov, Haifa (IL); Guy Mencel, Haifa (IL); Ofir Gabizon, Haifa (IL); Yuval Assaf, Haifa (IL)

(73) Assignee: ELBIT SYSTEMS LTD., Haifa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/788,191

(22) Filed: Jul. 30, 2024

(65) Prior Publication Data

US 2024/0385685 A1 Nov. 21, 2024

Related U.S. Application Data

(63) Continuation of application No. 18/402,769, filed on Jan. 3, 2024, now Pat. No. 12,099,648, which is a
(Continued)

(30) Foreign Application Priority Data

Jul. 4, 2021 (IL) ........................................ 284600

(51) Int. Cl.
*G06F 3/01* (2006.01)
*G06T 19/00* (2011.01)
*G09G 3/00* (2006.01)

(52) U.S. Cl.
CPC ............ *G06F 3/012* (2013.01); *G06T 19/006* (2013.01); *G09G 3/001* (2013.01);
(Continued)

(58) Field of Classification Search
CPC ... G06F 3/012; G06T 19/006; G09G 2356/00; G09G 2340/04; G09G 2354/00; G09G 3/001

See application file for complete search history.

(56) References Cited

U.S. PATENT DOCUMENTS 8,336,777 B1 12/2012 Pantuso et al.
8,587,659 B1 11/2013 Socolinsky et al.
(Continued)

FOREIGN PATENT DOCUMENTS

EP 4014087 A1 6/2022
IL 289147 B1 8/2024
(Continued)

OTHER PUBLICATIONS

Foxlin, E., Calloway, T. and Zhang, H., 2015. Design and Error Analysis of a Vehicular AR System With Auto-Harmonization. IEEE transactions on visualization and computer graphics, 21(12), pp. 1323-1335; Section 2.3 Camera Calibration, Fiducial Mapping and Vehicle Harmonization at pp. 1325-1326.

*Primary Examiner* — Muhammad N Edun
(74) *Attorney, Agent, or Firm* — S.J. Intellectual Property Ltd.

(57) ABSTRACT

A transfer-alignment system for a Head-Mounted Display (HMD), and a display coupled to the HMD, wherein the display is adapted to display images rendered by a display-processor, and wherein the HMD is monitored by a tracking system configured to provide information indicating position and/or orientation of the HMD with respect to a Frame of Reference (FoR), the system comprising: at least one first inertial sensor attached to the HMD and configured to acquire HMD's Inertial Readings Information (IRI); at least one second inertial sensor attached to the display and configured to acquire display's IRI; and a processor configured to: obtain the HMD's IRI, the display's IRI and the
(Continued)

information indicating the HMD's position and/or orientation with respect to the FoR; continuously analyze movement information of the HMD and the display to determine relative orientation therebetween; and cause the display-processor to adjust the images to conform with respect to the FoR.

8 Claims, 4 Drawing Sheets

Related U.S. Application Data continuation of application No. PCT/IL2022/050535, filed on May 23, 2022.

(60) Provisional application No. 63/277,778, filed on Nov. 10, 2021.

(52) U.S. Cl.
CPC ..... *G09G 2340/04* (2013.01); *G09G 2354/00* (2013.01); *G09G 2356/00* (2013.01)

(56) References Cited

U.S. PATENT DOCUMENTS

| | | | |
|---|---|---|---|
| 9,476,676 B1 | 10/2016 | Greenslade et al. | |
| 9,883,348 B1 | 1/2018 | Walker et al. | |
| 10,162,410 B1 | 12/2018 | Koenck et al. | |
| 10,580,386 B2* | 3/2020 | Gusikhin | G02B 27/0093 |
| 11,487,124 B2 | 11/2022 | Atac et al. | |
| 11,867,913 B2 | 1/2024 | Atac et al. | |
| 2004/0149036 A1* | 8/2004 | Foxlin | G01C 21/166 |
| | | | 702/94 |
| 2014/0191964 A1 | 7/2014 | McDonald et al. | |
| 2015/0317838 A1 | 11/2015 | Foxlin | |
| 2016/0041394 A1 | 2/2016 | Tanaka et al. | |
| 2016/0225192 A1 | 8/2016 | Jones et al. | |
| 2017/0045736 A1 | 2/2017 | Fu | |
| 2017/0212353 A1 | 7/2017 | Scales et al. | |
| 2017/0352190 A1 | 12/2017 | Calloway | |
| 2018/0143682 A1 | 5/2018 | Larson | |
| 2018/0266847 A1 | 9/2018 | Trythall et al. | |
| 2019/0139323 A1 | 5/2019 | Dearman et al. | |
| 2019/0196192 A1 | 6/2019 | Aymeric et al. | |
| 2019/0196198 A1 | 6/2019 | Aymeric et al. | |
| 2019/0197196 A1 | 6/2019 | Yang et al. | |
| 2019/0197995 A1 | 6/2019 | Ganille et al. | |
| 2020/0058169 A1 | 2/2020 | Friesenhahn et al. | |
| 2020/0150757 A1 | 5/2020 | Larson | |
| 2021/0048679 A1 | 2/2021 | Atac et al. | |
| 2022/0300073 A1 | 9/2022 | Reshidko et al. | |
| 2023/0074442 A1 | 3/2023 | Atac et al. | |
| 2024/0184123 A1 | 6/2024 | Atac et al. | |

FOREIGN PATENT DOCUMENTS

| | | |
|---|---|---|
| KR | 20220062523 A | 5/2022 |
| WO | 2021030682 A1 | 2/2021 |

* cited by examiner

CONFORMAL DISPLAY SYSTEM AND A METHOD THEREOF

TECHNICAL FIELD

The present disclosed subject matter relates to conformal displays. More particularly, the present disclosed subject matter relates to conforming between displays and tracking systems.

BACKGROUND

A head-worn display coupled with a head-tracking system enables users to view synthetically generated images in a way that they appear as a part of the real-world scenery. This technology of displaying, synthetic or real, elements as parts of the outside world was also adapted by disciplines, such as contact analog, linked scene, augmented reality, and outside conformal. The Highway In The Sky (HITS) Display System was one of the first applications in avionics, over the years more and more conformal counterparts have been devised for aircraft-related instruments. Among them are routing information, navigation aids, specialized landing displays, obstacle warnings, drift indicators, and many more.

With the mounting interest in optical see-through head-mounted displays across military, medical, and gaming settings many systems having different capabilities are rapidly entering the market. Despite such a variety of systems, they all require display calibration to create a proper mixed reality environment. With the aid of tracking systems, it is possible to register rendered graphics with tracked objects in the real world.

Military-grade solutions usually require large efforts for integration and alignment in an always-changing environment. Especially where components such as the magnetic/optical head tracker unit have to be recalibrated in case of changes to cockpit geometry, electromagnetic conditions, and different users.

BRIEF SUMMARY

According to a first aspect of the present disclosed subject matter, a conformal display system for a Head-Mounted Display (HMD), and a display coupled to a support-structure having at least one degree of freedom, wherein the display is adapted to display images rendered by a display-processor, and wherein the support-structure is monitored by a tracking system configured to provide information indicating the support-structure position and or orientation with respect to a frame of reference, the system comprising: at least one first inertial sensor attached to the support-structure and configured to acquire support-structure inertial readings information indicative of the support-structure movements over time; at least one second inertial sensor attached to the display and configured to acquire display inertial readings information indicative of the display movements over time; and a processor configured to: obtain the support-structure inertial readings information, the display inertial readings information and the information indicating the support-structure position and/or orientation with respect to the frame of reference; continuously analyze the HMD movement information and the display movement information to determine relative orientation between the support-structure and the display; and cause the display-processor to adjust the images to conform with respect to the frame of reference based on the information indicating the HMD's position and/or orientation and the relative movements.

In some exemplary embodiments, adjusting the images to conform with respect to the frame of reference provides accuracy enhancement of a line-of-sight designation.

In some exemplary embodiments, the HMD is worn by a user, and wherein the display is elected from the group consisting of: a see-through display; an opaque display; and any combination thereof.

In some exemplary embodiments, the user is operating a platform the frame of reference.

The system of claim 4, further comprising at least one platform-sensor attached to the platform and configured to acquire platform movements information indicative of the platform's movements over time with respect to a fixed coordinate system established in space, wherein the processor causes the display-processor to adjust the images also to compensate for the platform's movements over time.

In some exemplary embodiments, the at least one inertial HMD-sensor and the at least one inertial display-sensor and the at least one platform-sensor are inertial measurement units.

In some exemplary embodiments, the display displays to the user an augmented reality view comprised of scenes external to the platform and wherein the images are conformal to the external scenes.

In some exemplary embodiments, the display displays to the user a virtual reality comprised of scenes external to the platform rendered by a video camera mounted on the HMD and wherein the images are conformal to the external scenes.

In some exemplary embodiments, the images are selected from the group consisting of: graphical symbology; thermal images; text; video; synthetically generated images; and any combination thereof.

In some exemplary embodiments, the see-through head-worn display can be mechanically adjusted by the user along the at least one degree of freedom.

In some exemplary embodiments, the tracking system is selected from the group consisting of an electro-optical system; an electromagnetic system; and a combination thereof.

In some exemplary embodiments, the HMD movement information, the display movement information and the information indicating the HMD's position and/or orientation with respect to the frame of reference, and wherein the frame of reference is selected from the group consisting of a platform coordinates; a fixed coordinate system established in space; an earth coordinate system; and any combination thereof.

According to another aspect of the present disclosed subject matter A tracking system between coordinates of a platform, having an inertial-sensor, and a tracking system comprising a tracking-reference-unit (TRU) and a tracking module coupled to a head-mounted-device, the system comprising: At least one TRU inertial-sensor attached to the TRU; and a processor configured to receive information indicative of the helmet orientation relative to the TRU from the tracking system; and inertial information of the inertial-sensor and the at least one TRU inertial-sensor, wherein the processor utilizes the angular rates to dynamically calculate a transfer-alignment between the TRU and the platform's coordinates, and wherein the tracking system is configured to update the head-mounted-device orientation relative to the platform based on an updated TRU alignment and the information.

In some exemplary embodiments, the head-mounted-device comprises at least one element selected from the group consisting of a display; at least one sensor; and any combination thereof, wherein the head-mounted-device is worn by a user operating the platform, and wherein the at least one element is conformal to coordinates selected from the group consisting of platform's coordinates; earth coordinates; and any combination thereof.

In some exemplary embodiments, the at least one TRU inertial-sensor is an inertial measurement unit selected from the group consisting of at least one accelerometer; angular rate sensors; gyroscopes; and any combination thereof.

In some exemplary embodiments, the HMD comprises a see-through display displaying to the user an augmented reality or virtual reality view comprised of scenes external to the platform and images that are conformal to at least one external scene and the platform.

In some exemplary embodiments, the images are selected from the group consisting of graphical symbology; thermal images; text; video; synthetically generated images; and any combination thereof.

In some exemplary embodiments, the tracking system is selected from the group consisting of an electro-optical system; an electromagnetic system; and a combination thereof.

In some exemplary embodiments, the system further comprises a plurality of inertial measurement units coupled to a plurality of modules of the platform, wherein the processor further acquires angular rates from the plurality of inertial measurement units for enhancing the transfer-alignment accuracy.

According to yet another aspect of the present disclosed subject matter a tracking method, the method comprising: receiving movements information from the at least one inertial HMD-sensor; receiving movements information from the at least one inertial display-sensor; determining a Line of Sight (LOS) of the HMD referring to coordinates of the platform; determining a LOS of the display based on a relative orientation between the HMD and the display derived from movements information of the at least one inertial HMD-sensor and the at least one inertial display-sensor; adjusting the images on the display so as the LOS of the HMD and the LOS of the display overlap to yield conformal display.

In some exemplary embodiments, the method comprising: receiving angular rates from the at least one inertial TRU-sensor and the inertial-sensor; receiving information indicating the orientation and position of the HMD from the tracking system; utilizing a transfer alignment algorithm for dynamically calculating a relative orientation between the TRU and the platform's coordinates and continually compensating the information indicating the orientation and position of the HMD.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings.

DETAILED DESCRIPTION

Figure 1:
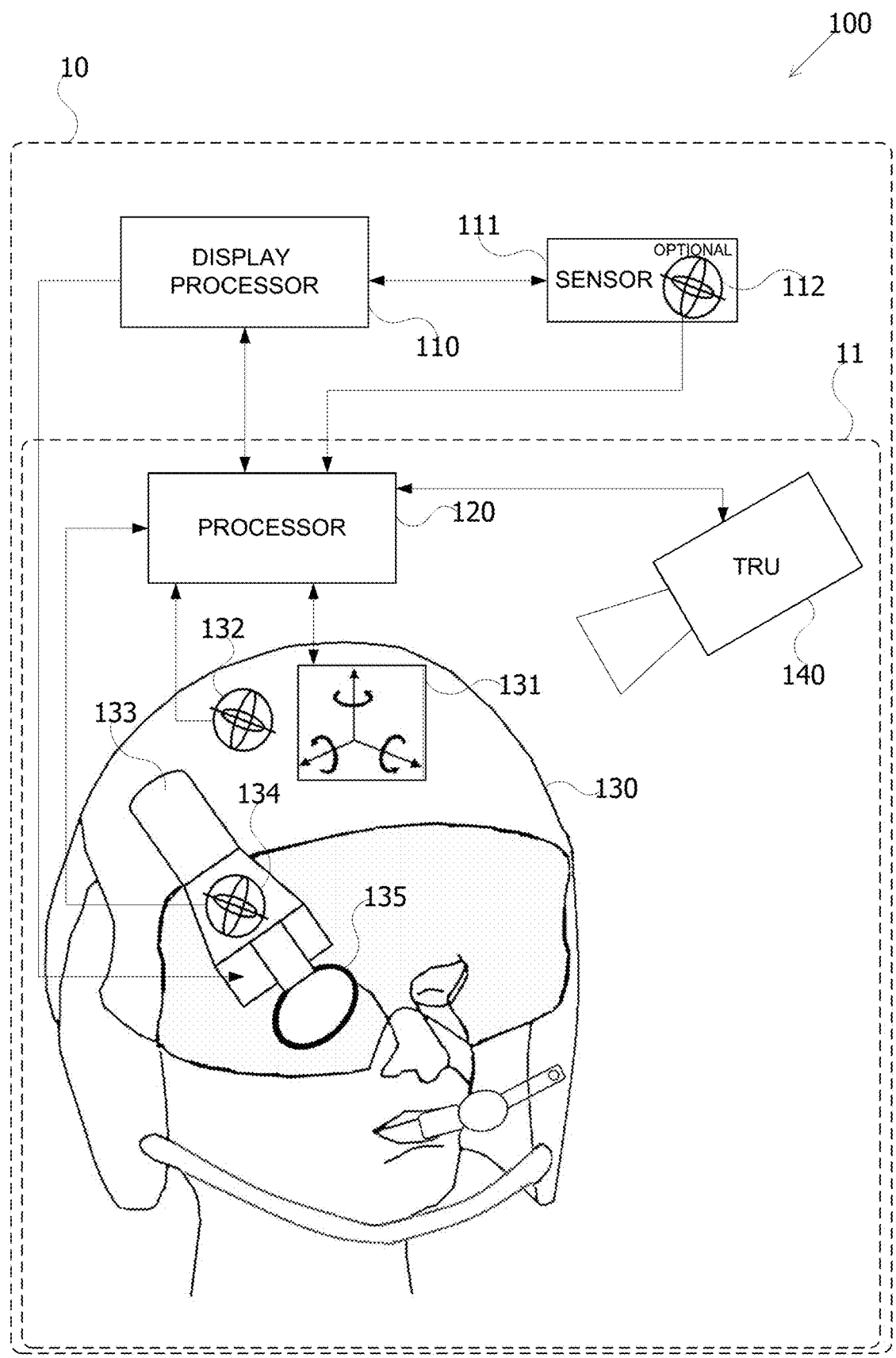
FIG. 1 shows a schematic block diagram of a conformal display system, in accordance with some exemplary embodiments of the disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "Processor", "Display-processor", Computer of a Platform", "Platform's Computer" or the like, include action and/or processes of a computer that manipulate and/or transform data into other data, said data represented as physical quantities, e.g. such as electronic quantities, and/or said data representing the physical objects. The terms "computer", "processor", "processing resource", "processing circuitry", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
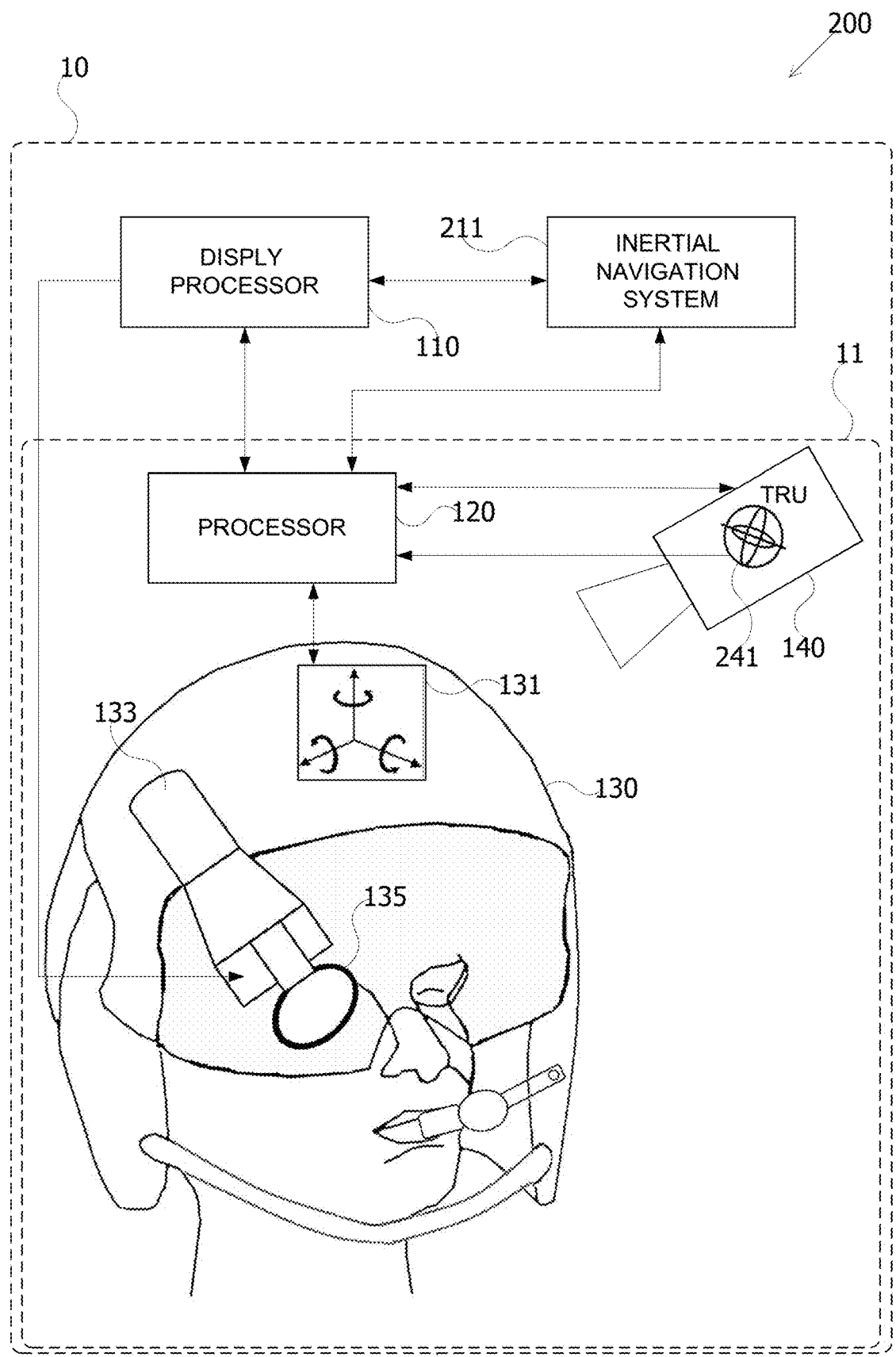
FIG. 2 shows a schematic block diagram of a transfer-alignment system, in accordance with some exemplary embodiments of the disclosed subject matter.
Figure 4:
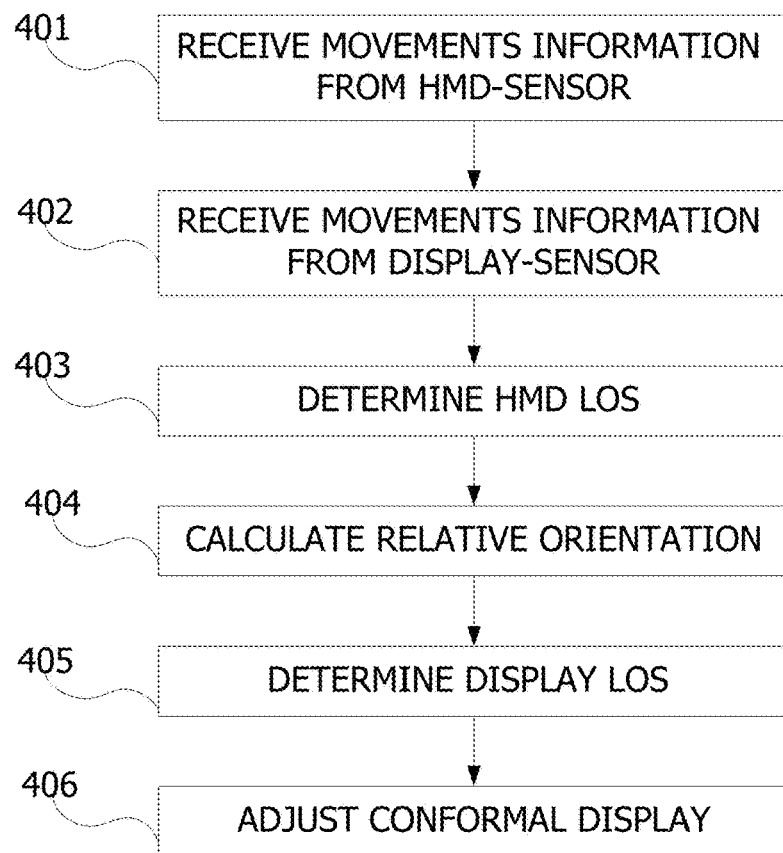
FIG. 4 shows a flowchart diagram of a conformal display method, in accordance with some exemplary embodiments of the disclosed subject matter.
Figure 5:
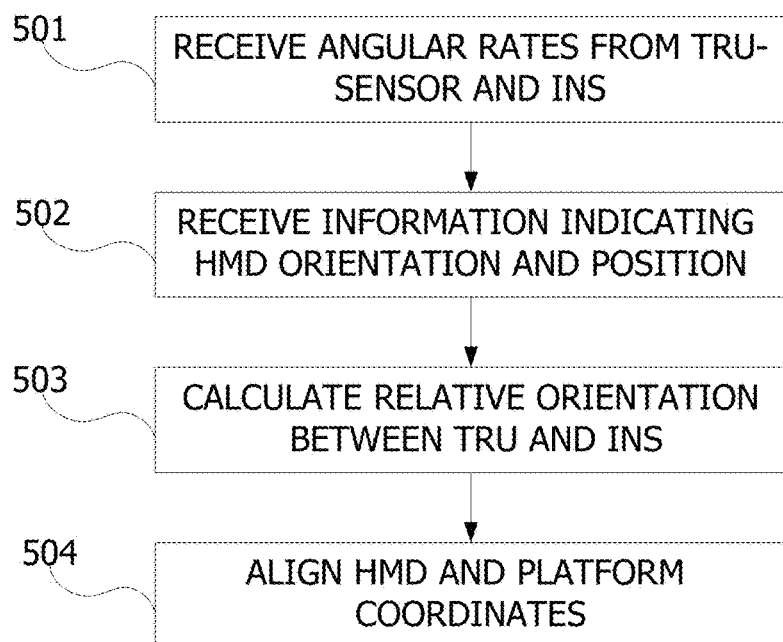
FIG. 5 shows a flowchart diagram of a transfer-alignment method, in accordance with some exemplary embodiments of the disclosed subject matter.

In embodiments of the presently disclosed subject matter, fewer, more and/or different stages than those shown in FIGS. 4 and 5 may be executed. In embodiments of the presently disclosed subject matter one or more stages illustrated in FIGS. 4 and 5 may be executed in a different order and/or one or more groups of stages may be executed simultaneously. FIGS. 1 and 2 illustrates a general schematic of the system architecture in accordance with an embodiment of the presently disclosed subject matter. Each module in FIGS. 1 and 2 can be made up of any combination of software, hardware and/or firmware that performs the functions as defined and explained herein. The modules in FIGS. 1 and 2 may be centralized in one location or dispersed over more than one location. In other embodiments of the presently disclosed subject matter, the system may comprise fewer, more, and/or different modules than those shown in FIGS. 1 and 2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

One technical problem dealt with by the disclosed subject matter is a potential misalignment between a helmet and a wearable display coupled to it.

It should be noted that such misalignments may result from using wearable displays, which comprise an adjustment mechanism that makes up for different interpupillary distances and other physiological variables. Additionally, coupling (connection) between the display and the helmet may grow poor during operational conditions, such as vibrations, high G maneuvers, temperature changes, distortions caused by material aging, and any combination thereof, or the like. All the above can be a cause for misalignments.

Wearable displays, having a see-through capability, such as a Head Wearable Display (HWD), or a Helmet Mounted Display (HMD) have to be conformed to known reference coordinates in order to enable a real-time display augmentation. Thus, a tracking system, of a platform, that monitors the helmet and a wearable display must be aligned with one another.

It should be noted that the term "platform" may refer in this present disclosure to any type of vehicle, an airplane, a ship, a person, or a boat, which incorporate a tracking system.

One technical solution is to continually compute relative geometric orientation between the wearable display and the helmet, which will be used to compensate for any potential misalignment during operational use. In some exemplary embodiments, a transfer-alignment algorithm may be invoked to determine the relative geometric orientation, which are used by a display-processor, rendering computerized images to the display, to compensate for such misalignment by aligning its images with real-world scenes in order to gain conformal display.

One technical effect of utilizing the disclosed subject matter is facilitating a real-time continuous automatic alignment process between the display and the tracker modules. And thereby enhancing the HMD/HWD accuracy throughout the operation in addition to alleviating lengthy and expensive manual calibration.

Another technical problem dealt with by the disclosed subject matter is a potential misalignment between coordinates of the platform's sensors and the coordinates of the tracking system, consequently the display as well. Such misalignment may result in deflecting the computerized images derived from the sensors, with respect to a real-world scene on the display.

It should be noted that the sensors and the tracking system, are mechanically installed on the platform with limited accuracy due to unavoidable mechanical tolerances, temperature, and stress factors, or the like. Harmonizing these elements to reference coordinates is a cumbersome, lengthy and expensive process, which may have to be repeated time and again.

It should also be noted that the platform comprises sensors, such as Inertial Navigation System (INS), Forward-Looking-Infrared (FLIR), Light Detection and Ranging (LiDAR), Radar, Enhanced Vision System (EVS) and the like that are aligned with the platform's coordinate and possibly a fixed coordinate system established in space. It will be appreciated that the platform and its sensors may be configured to be guided by an HMD/HWD guided tracking system. Thus, one of the present discloser objectives is providing coordinates congruence between the tracking system and the platform.

Another technical solution is to dynamically determine a relative orientation between a TRU of the tracking system and the INS of the platform, thereupon compensate for any potential misalignment between coordinates during operational use.

In some exemplary embodiments, a transfer-alignment process may be utilized to correct misalignment between the TRU of the tracking system and the INS of the platform. Thereby, conforming the wearable see-through display to reference coordinates of the platform.

Another technical effect of utilizing the disclosed subject matter is facilitating a real-time continuous automatic alignment process between the platform and the tracker modules. And thereby enhancing the HMD/HWD accuracy throughout the operation in addition to alleviating lengthy and expensive manual calibration.

Referring now to FIG. 1 showing a schematic block diagram of a conformal display system, in accordance with some exemplary embodiments of the disclosed subject matter. A conformal display system (System) 100 may be a computerized system configured to dynamically conform between images derived from sensors obeying a LOS of the tracking system and a LOS that the user sees scenery external to Platform 10 on the display.

In some exemplary embodiments, System 100 may be situated (but not limited to) in a Compartment 11 of Platform 10 that also accommodates a user wearing a HMD 130 that has a Display Unit 133. In some exemplary embodiments, System 100 may be comprised of a Processor 120, a TRU 140 attached to Compartment 11, a Tracking Module 131, at least one inertial HMD-sensor (Sensor) 132 attached to HMD 130, and inertial display-sensor (Sensor) 134 attached to Display Unit 133.

In some exemplary embodiments, Processor 120, TRU 140, and Tracking Module 131 form together an apparatus system configured to sense elevation, azimuth, and roll, i.e., orientation and position, of HMD 130 relative to Platform 10. Different technology methods, such as inertial; optical; electromagnetic; sonic; and any combination thereof, or the like can be utilized for implementing such tracking system.

For example, an optical-based tracking apparatus may utilize one or more electro-optical emitters connected to either Tracking Module 131, or TRU 140, and one or more electro-optical detectors connected to either TRU 140 or Tracking Module 131. The one or more electro-optical detectors constantly observe the one or more electro-optical emitters for sensing the orientation and position of HMD 130. Additionally, or alternatively, an electromagnetic-based tracking apparatus may be utilized. This type of apparatus employs coils connected to Tracking Module 131 of HMD 130, which is present within an alternating field generated in multiple axes within Compartment 11 and controlled by TRU 140. These coils are adapted to produce for the Tracking Module 131 alternating electrical current signal, indicative of the movement of HMD 130 in Compartment 11.

In some exemplary embodiments, Processor 120 acquire from TRU 140 and Tracking Module 131 information, such as signals, electrical current, or the like, indicative of the orientation and position of HMD 130 in order to determine a LOS on which the user, wearing the HMD 130 is pointing (looking at). Processor 120 simultaneously indicates the LOS to a computer (not shown) of Platform 10, which instructs platform's sensors, such as INS, FLIR, LiDAR, Radar, or the like to aim the sensors in line with the LOS.

Display-processor 110 is configured to generate and render images to a display device; such as an Eyepiece 135 of Display Unit 133, a visor (not shown), and any combination thereof, or the like; based on information obtained from the sensors and/or computerized information. In some exemplary embodiments, the images can be synthetically generated digital images, textual information, graphical symbology, processed and/or unprocessed video originated from electro-optical sensors, and any combination thereof, or the like.

In some exemplary embodiments, Eyepiece 135, or the like, may be a see-through transparent screen display that allows the user to watch on the screen real-time augmentation of the rendered images while still being able to see through it the real-world scenery.

In some exemplary embodiments, HMD 130 may comprise an attached video camera (not shown) adapted to render real-world scenery, i.e., scenes external to Platform 10, to the screen of Eyepiece 135. Thereby, providing for a real-time virtual-reality display that renders computerized images and real-world scenery provided by the video camera.

It will be appreciated that misalignment between HMD 130 and Display Unit 133 and thereby Eyepiece 135 coupled to it, can result in a miss-congruence between an actual LOS that the user sees and LOS calculated by the tracking system, which the platform's sensors adhere to.

It should be noted that the misalignment may result from Display Unit 133 connected by a support-structure that has an adjustment mechanism used to make up for different interpupillary distances and other physiological variables. Additionally, the support-structure connecting between Display Unit 133 and HMD 130 may grow poor during operational conditions, such as vibrations, high G maneuvers, temperature changes, distortions caused by material aging, and any combination thereof, or the like.

Figure 3A:
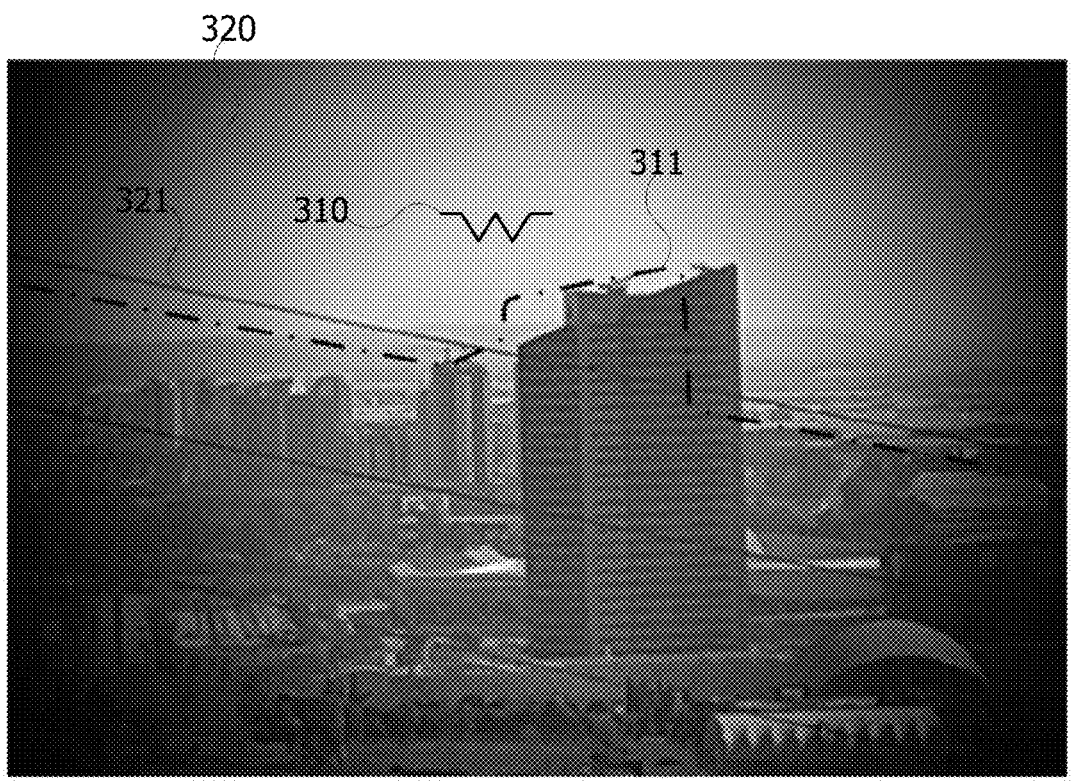
FIGS. 3A and 3B show screenshots of real-time augmentation of generated image and real-world view, in accordance with some exemplary embodiments of the disclosed subject matter.

Referring now to FIG. 3A showing a screenshot of real-time augmentation of generated (computerized) images and real-world view, in accordance with some exemplary embodiments of the disclosed subject matter. The screenshot depicts an urban area 320 having powerlines 321, i.e., real-world view, as viewed by the user through Eyepiece 135, of FIG. 1. A Symbol 310 shows the Platform 10 level with respect to the Horizon and a Symbol 311 shows a flight safety line. Both Symbols 310 and 311 are synthetic images generated by the platform computer based on the platform's sensors, which are superimposed on the urban area 320 real view, i.e., augmented reality.

As appreciated from the screenshot, of FIG. 3A, there is a lack of correspondence between the terrain and the obstacles (building and powerline 321) as seen on the screen of Eyepiece 135, and the calculated symbol 311 that shows the flight safety line. It will be understood that the lack of correspondence between the real-world view and the generated images results from the miss-congruence between an actual LOS that the user sees and the LOS calculated by the tracking system.

Referring back to FIG. 1. In some exemplary embodiments, Sensor 132, attached to HMD 130, and Sensor 134, attached to Display Unit 133, may be an Inertial Measurement Unit (IMU) that may be configured to measure and report to Processor 120 acceleration, orientation, angular rates, and other gravitational forces of items to which they are attached to. The IMU may be based on technology, such as Fiber Optic Gyroscope (FOG), Ring Laser Gyroscope (RLG), Micro Electro-Mechanical Systems (MEMS) and any combination thereof, or the like.

In some exemplary embodiments at least one Sensor 132 embedded into HMD 130 is configured to produce information, e.g., angular-rate signal, to Processor 120, which is indicative of HMD 130 movements over time. And at least one Sensor 132 embedded into Display Unit 133 is configured to produce information, e.g., angular-rate signal, to Processor 120, which is indicative of Display Unit 133 movements over time.

In some exemplary embodiments of the disclosed subject matter, misalignment between Display Unit 133 and HMD 130 may be determined by continuously analyzing the angular rates of Sensors 132 and 134, in order to determine, using Processor 120, their relative movements and thereby their relative orientation.

Additionally, or alternatively, System 100 may further comprise at least one inertial platform-sensor (Sensor) 112 attached to Platform 10. Sensors 112 may be a sensor, such as Sensors 132 and 134, configured to provide Platform 10 movements information indicative of the platform's movements over time with respect to a fixed coordinate system established in space. In some exemplary embodiments, Sensors 112 produce and provide angular-rate signal, based on Platform 10 movements information, to Processor 120. In some exemplary embodiments, Sensor 112 may be used by Processor 120 to determine an orientation reference while continuously analyzing the angular rates of Sensor 132 and 134 in order to determine their relative movements and thereby their relative orientation reference.

In some exemplary embodiments, System 100 may utilize Processor 120 to perform methods such as depicted in FIG. 4. Processor 120 may be also utilized to perform computations required by System 100 or any of its subcomponents. It should be noted that Processor 120 may be deployed in any location of Platform 10 and may comprise a collection of assisting processing devices and services, such as Display-processor 110, one or more computers of Platform 10, and any combination thereof, or the like.

According to an aspect of the present disclosed subject matter, Processor 120 is configured to: obtain and continuously analyze HMD's 130 movement information, Display Unit 133 movement information, and information indicating the position and orientation of HMD 130 with respect to Platform 10. Processor 120 is also configured to determine relative orientation between HMD 130 and Display Unit 133 and cause the display-processor to adjust the images to compensate for the relative orientation changes, and to conform with the information indicating HMD 130 position and orientation with respect to Platform 10.

In some exemplary embodiments of the disclosed subject matter, Processor 120 may comprise an I/O module (not shown). The I/O module may be utilized as an interface to transmit and/or receive information and instructions between Processor 120 and components of System 100.

In some exemplary embodiments, Processor 120 may comprise a memory module (not shown). The memory module may be comprised of volatile and/or non-volatile memories, based on technologies such as semiconductor, magnetic, optical, flash, a combination thereof, or the like. The memory module (not shown) may retain program code operative to cause Processor 120 to perform acts associated with any of the steps shown in FIG. 4. In some exemplary embodiments, the memory module (not shown) of Processor 120 may be used to retain information obtained from Sensors 132 and 134 as well as information indicating the position and orientation of HMD 130 with respect to Platform 10.

In some exemplary embodiments, Processor 120 dynamically calculates a relative orientation between Display Unit 133 and HMD 130 in order to detect misalignments of Display Unit 133 relative to HMD 130, and consequently misalignments with respect to Platform 10 coordinates. The dynamic calculation may also involve causing Display-processor 110 to dynamically adjust its rendered images in order to compensate for the misalignment based on the relative orientation between Display Unit 133 and HMD 130. Such compensation results in a conformal display between rendered images (e.g., Symbols 310 and 311' of FIG. 3B) with the user's scene (e.g., Urban area 320 of FIG. 3B).

It should be noted that the misalignment, described above can be understood as shift of a viewpoint, and therefore the LOS, of the user with respect to a viewpoint, and therefore the LOS, of the tracking system of HMD 130, i.e., LOS of Platform 10 and its sensors.

In some exemplary embodiments, Processor 120 may utilize a transfer alignment algorithm to compute the relative orientation between Display Unit 133 and HMD 130, i.e., misalignment of Display Unit 133. The transfer alignment algorithm resolves an alignment matrix, based on real time measurements of angular rates produced by Sensors 132 and 134.

In some exemplary embodiments, the transfer alignment algorithm comprises: analyzing the angular rates; synchronizing data streams of the angular rates, determining Sensors 132 and 134 relative biases, extracting Sensors 132 and 134 relative orientation (i.e., alignment) and any combination thereof, or the like.

In some exemplary embodiments, the transfer alignment algorithm runs continuously to dynamically compensate and improve the alignment functionality. Additionally, or alternatively, the algorithm may be utilized for monitoring and testing the alignment integrity, functionality, and possibly alert the operator in case of failures, as defined for the intended use.

In some exemplary embodiments, the extracted orientation may be utilized by the computer of Platform, the tracking system, and Display-processor 110 to facilitate Processor 120 in performing acts associated with any of the steps shown in FIGS. 4 and 5.

Figure 3B:
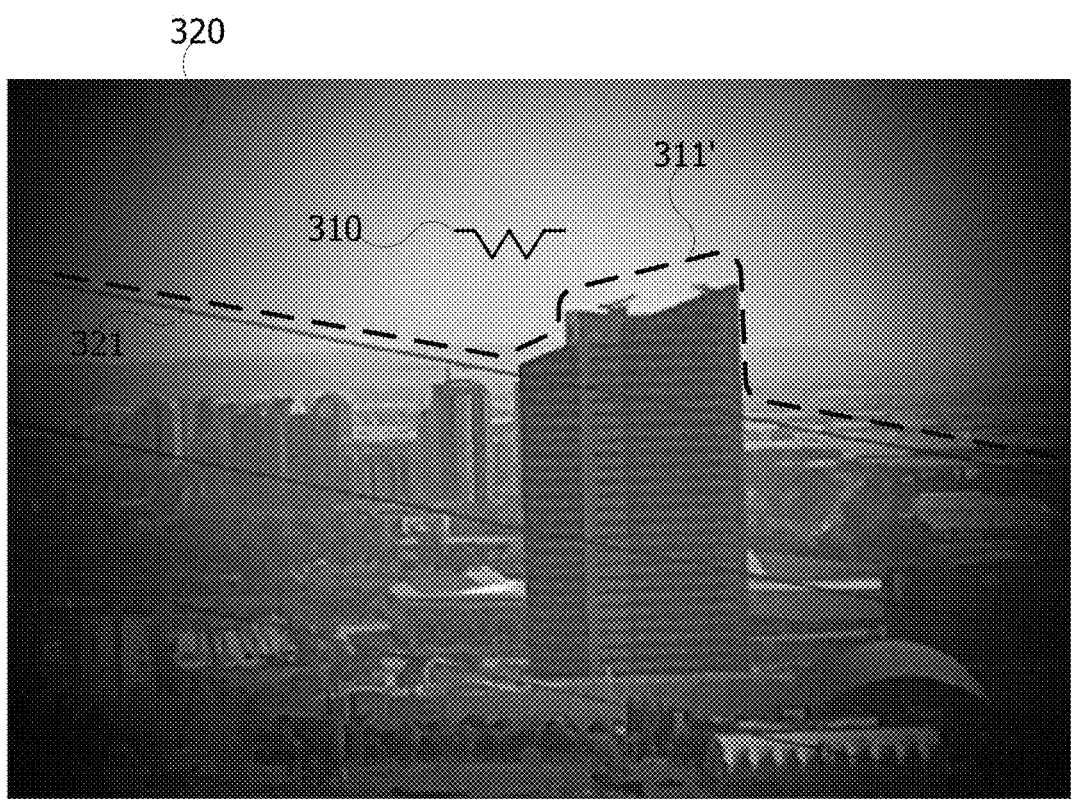

Referring now to FIG. 3B showing a screenshot of real-time augmentation of generated image and real-world view, in accordance with some exemplary embodiments of the disclosed subject matter. The screenshot depicts an urban area 320 having powerlines 321, i.e., real-world view, as viewed by the user through Eyepiece 135, of FIG. 1. Symbol 310 shows Platform 10 level with respect to the Horizon and Symbol 311' shows a flight safety line. Both Symbols 310 and 311 are synthetic images generated by the platform computer based on the platform's sensors, which are superimposed on the urban area 320 real view, i.e., augmented reality.

As appreciated from the screenshot, of FIG. 3B, the terrain and the obstacles (building and powerline 321) as seen on the screen of Eyepiece 135 correspondence to the calculated symbol 311' that shows the flight safety line. It will be understood that the correspondence between the real-world view and the generated images results from a dynamic alignment between an actual LOS that the user sees and the LOS calculated by the tracking system.

Referring now to FIG. 2 showing a schematic block diagram of a transfer-alignment system, in accordance with some exemplary embodiments of the disclosed subject matter. A transfer-alignment system (System) 200 may be a computerized system configured to conform between coordinates of the tracking system and coordinates of a platform and perform methods such as depicted in FIG. 5.

In some exemplary embodiments, System 200 may be situated in Compartment 11 and/or Platform 10 that also accommodates a user wearing HMD 130 comprising Display Unit 133 and Tracking Module 131. In some exemplary embodiments, System 200 may be comprised of a Processor 120, a TRU 140 attached to Compartment 11 of Platform 10, at least one inertial TRU-sensor (Sensor) 241 attached to TRU 140, and an INS 211 attached to Platform 10.

In some exemplary embodiments, system 200 of the present discloser may be utilized to transfer-alignment between coordinates of Platform 10, through INS 211 connected to Platform 10, and a tracking system, through Sensor 241 embedded into TRU 140, and connected to Compartment 11 of Platform 10.

It will be reminded that the tracking system is used for tracking movements, position, and orientation of HMD130 and thereby the LOS of the user with respect to the platform.

Thus, one of the objectives of the present discloser is maintaining congruence between coordinates of TRU 140 and Platform 10.

In some exemplary embodiments, Processor 120, TRU 140, and Tracking Module 131 form together a tracking system configured to sense elevation, azimuth, and roll, i.e., orientation and position, of HMD 130 relative to Platform 10. It will be appreciated that the tracking system of FIG. 2 may be identical or similar to the tracking system described in FIG. 1, and therefore perform the same activities, such as depicted in FIG. 1 above.

In some exemplary embodiments, Processor 120 acquire from TRU 140 and Tracking Module 131 information, such as signals, electrical current, or the like, indicative of the orientation and position of HMD 130 in order to determine a LOS on which the user, wearing the HMD 130 is pointing (looking at). Processor 120 simultaneously indicates the LOS to a computer (not shown) of Platform 10, which instructs platform's sensors, such as INS, FLIR, LIDAR, Radar, or the like to aim the sensors in line with the LOS.

Display-processor 110 is configured to generate and render images to a display device; such as an Eyepiece 135 of Display Unit 133, a visor (not shown), and any combination thereof, or the like; based on information obtained from the sensors and/or computerized information. In some exemplary embodiments, the images can be synthetically generated digital images, textual information, graphical symbology, processed and/or unprocessed video originated from electro-optical sensors, and any combination thereof, or the like.

It will be appreciated that misalignment between coordinates of TRU 140 and INS 211, representing Platform 10 (i.e., misalignment between TRU 140 and Platform 10) can result in a miss-congruence between a LOS of the tracking system and the LOS of Platform 10, thereby the LOS that the platform's sensors adhere to.

It should be noted that alignment between coordinates of, mechanically assembled, TRU 140 and INS 211 may grow poor during operational conditions, such as vibrations, high G maneuvers, temperature changes, distortions caused by material aging, and any combination thereof, or the like. Additionally, mechanically installed components have inherently limited accuracy due to unavoidable mechanical tolerances. Moreover, a maintenances process for harmonizing such components to reference coordinates is cumbersome, lengthy, expensive, and adding human error factors that may have to be repeated time and again.

In some exemplary embodiments, Sensor 241, attached to TRU 140, may be an Inertial Measurement Unit (IMU) similar to Sensors 132 and 134, of FIG. 1, and may be configured to perform the similar activities, such as of Sensors 132 and 134, of FIG. 1.

In some exemplary embodiments, INS 211 may be a self-contained Inertial navigation system using navigation techniques-based measurements provided by accelerometers and gyroscopes are used to track position and orientation of Platform 10 relative to a known starting point, orientation and velocity. The INS 211 contains three orthogonal rate-gyroscopes and three orthogonal accelerometers, measuring angular velocity and linear acceleration respectively, which may be represented by information, in a form of one or more angular-rate-signals.

In some exemplary embodiments at least one Sensor 241 embedded into TRU 140 is configured to provide information, in a form of angular-rate signal, to Processor 120, which is indicative of HMD 130 movements over time. At least one INS 211 connected to Platform 10, which is configured to provide information, in a form of angular-rate signal, to Processor 120, which is indicative of Display Unit 133 movements over time.

In some exemplary embodiments, misalignment of TRU 140 with respect to Platform 10 may be determined by continuously analyzing the angular rates of Sensor 241 and INS 211, in order to determine, using Processor 120, their relative movements and thereby their relative orientation.

In some exemplary embodiments, System 200 may utilize Processor 120 to perform methods such as depicted in FIG. 5. Processor 120 may be also utilized to perform computations required by the System 200 or any of its subcomponents. It should be noted that Processor 120 may be deployed in any location of Platform 10 and may comprise a collection of assisting processing devices and services, such as Display-processor 110, one or more computers of Platform 10, and any combination thereof, or the like.

According to another aspect of the present discloser, Processor 120 is configured to receive information, from the tracking system, indicating HMD's 130 orientation relative to TRU 140 in addition to angular rates of INS 211. Processor 120 utilizes the information and the angular rates to dynamically calculate a transfer-alignment between TRU 140 and Platform 10 coordinates to be also utilized by the tracking system for alignment compensation between the HMD 130 and the platform.

In some exemplary embodiments of the disclosed subject matter, Processor 120 may comprise an I/O module (not shown). The I/O module may be utilized as an interface to transmit and/or receive information and instructions between Processor 120 and components of System 200.

In some exemplary embodiments, Processor 120 may comprise a memory module (not shown). The memory module may be comprised of volatile and/or non-volatile memories, based on technologies such as semiconductor, magnetic, optical, flash, a combination thereof, or the like. The memory module (not shown) may retain program code operative to cause Processor 120 to perform acts associated with any of the steps shown in FIGS. 4, and 5. In some exemplary embodiments, the memory module (not shown) of Processor 120 may be used to retain information obtained from Sensor 241 and from INS 211, and thereby information indicating the position and orientation of HMD 130 with respect to Platform 10.

In some exemplary embodiments, Processor 120 dynamically calculates a relative orientation between TRU 140 and INS 211 in order to detect misalignments of TRU 140 relative to Platform 10, and consequently misalignments of HMD 130 with respect to platform's sensors. The dynamic calculation may also involve causing Display-processor 110 to dynamically adjust its rendered images in order to compensate for the misalignment based on the relative orientation between TRU 140 and INS 211. Such compensation results in a conformal display between rendered images (e.g., Symbols 310 and 311' of FIG. 3B) with the user's scene (e.g., Urban area 320 of FIG. 3B).

It should be noted that the misalignment, described above, can be understood as shift of a viewpoint, and therefore the LOS of the tracking system of HMD 130, with respect to a viewpoint of Platform 10 and therefore the LOS and the sensors, such as INS, FLIR, LIDAR, Radar, or the like of Platform 10.

In some exemplary embodiments, Processor 120 may utilize a transfer-alignment algorithm to compute the relative orientation between TRU 140 and INS 211, i.e., misalignment of TRU 140. The transfer alignment algorithm resolves an alignment matrix, based on real time measurements of angular rates produced by Sensor 241 and INS 211.

In some exemplary embodiments, the transfer alignment algorithm comprises: analyzing the angular rates; synchronizing data streams of the angular rates, determining Sensor 241 and INS 211 relative bias, extracting Sensor 241 and INS 211 relative orientation (i.e., alignment) and any combination thereof, or the like.

In some exemplary embodiments, the transfer alignment algorithm runs continuously to dynamically compensate and improve the alignment functionality. Additionally, or alternatively, the algorithm may be utilized for monitoring and testing the alignment integrity, functionality, and possibly alert the operator in case of failures, as defined for the intended use.

In some exemplary embodiments, the extracted orientation may be utilized by the computer of Platform, the tracking system, and Display-processor 110 to facilitates Processor 120 in performing acts associated with any of the steps shown in FIG. 5.

Referring now to FIG. 4 showing a flowchart diagram of a conformal display method, in accordance with some exemplary embodiments of the disclosed subject matter. The conformal display method may be performed by System 100, of FIG. 1. In some exemplary embodiments, the conformal display method continuously analyzes the relative orientation between HMD 130 and Display Unit 133 in order to dynamically sustain conformal display. Additionally, the method is operative to cause Display-processor 110 to adjust rendered images that are aligned to the tracking system's LOS based on the relative orientation.

In step 401, a movements information of HMD 130 may be received from Sensor 132. In some exemplary embodiments, an angular-rates signal generated by Sensor 132 continuously provides Processor 120 with information indicative of HMD 130 movements.

In step 402, a movements information of Display Unit 133 may be received from Sensor 134. In some exemplary embodiments, an angular-rates signal generated by Sensor 134 continuously provides Processor 120 with information indicative of Display Unit 133 movements.

In step 403, a LOS of HMD 130 may be determined. In some exemplary embodiments, Processor 120 utilizes information generated by the tracking system for determining the LOS at which HMD 130 is aiming. The LOS and thus, the coordinates of HMD 130 and Platform 10, including its sensors, are aligned together. Additionally, or alternatively, Platform 10 may also align with a coordinate system established in space.

In step 404, a relative orientation between HMD 130 and the Display Unit 133 may be calculated. In some exemplary embodiments, Processor 120 may execute a transfer alignment algorithm (to be described in detail further below) in order to dynamically calculate the relative orientation. The relative orientation may be derived, by the transfer alignment algorithm, from movement information provided by Sensors 132 and 134.

In step 405, a LOS of Display Unit 133 may be determined. In some exemplary embodiments, the LOS of Display Unit 133 can be derived from the relative orientation calculation of Step 404. Using transfer alignment algorithm (to be described in detail further below) yields the position and orientation of Display Unit 133 with respect to the known coordinates of HMD 130, and thereby Platform 10, which thereafter allows extracting the LOS of Display Unit 133.

In step 406, the images on the display may be adjusted. In some exemplary embodiments, Processor 120, but not limited to, instructs Display-processor 110 to adjust its rendered images on Eyepiece 135 in order to bring the images to congruence with scenes viewed, by the user on, Eyepiece 135. That is to say, aligning the images so as the LOS of HMD 130, (i.e., Platform 10) and the LOS of Display Unit 133 overlap to yield conformal display.

It is to be still further noted that, with reference to FIG. 4, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagram is described also with reference to the system elements that realizes them, this is by no means binding, and the blocks can be performed by elements other than those described herein.

Referring now to FIG. 5 showing a flowchart diagram of a transfer-alignment method, in accordance with some exemplary embodiments of the disclosed subject matter. In some exemplary embodiments, the transfer-alignment method may be performed by System 200, of FIG. 1, to continuously analyze the relative orientation between TRU 140 and INS 211 that represents coordinates of Platform 10. Additionally, or alternatively, the transfer-alignment method is configured to dynamically compensate for misalignments of HMD 130 tracking with respect to Platform 10.

In step 501, angular rates from Sensor 241 and INS 211 may be received. In some exemplary embodiments, an angular-rates signal generated by Sensor 241 and an angular-rates signal generated by INS 211 continuously provide Processor 120 with information indicating TRU 140 (i.e., tracking system) movements and INS 211 (i.e., Platform 10) movements.

In step 502, information indicating the orientation and position of HMD 130 may be received from the tracking system.

In step 503, a relative orientation between TRU 140 and INS 211 may be calculated. In some exemplary embodiments, Processor 120 may execute a transfer alignment algorithm (to be described in detail further below) in order to dynamically calculate the relative orientation. The relative orientation may be derived, by the transfer alignment algorithm, from movement information provided by Sensors 241 and INS 211.

In step 504, misaligned coordinates of HMD 130 may be corrected. In some exemplary embodiments, information, provided by the tracking system, that indicates the orientation and position of HMD 130 may be continually compensated in order to match the tracking system to Platform 10 coordinates.

It is to be still further noted that, with reference to FIG. 5, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagram is described also with reference to the system elements that realizes them, this is by no means binding, and the blocks can be performed by elements other than those described herein.

Description of an Exemplary Transfer Alignment Algorithm

Exemplary parameters of the exemplary transfer alignment algorithm listed in the following table.

| Input variables | Format | Description | Units |
|---|---|---|---|
| $W_{gyro1}$ | floatX3XN | Angular velocity of gyro1 (e.g., Sensor132) | deg/sec |
| $W_{gyro2}$ | floatX3XN | Angular velocity of gyro2 (e.g., Sensor134) | deg/sec |
| $t_{gyro2}$ | floatXN | time tags of gyro1 | sec |
| $t_{gyro2}$ | floatXN | time tags of gyro2 | sec |
| Isvalid1 | boolXN | validity of measurement of gyro1 | none |
| Isvalid2 | boolXN | validity of measurement of gyro2 | none |
| Control Parameter | Format | Description | Units |
| Spacing between time points | float | Spacing between time points | sec |
| Threshold for interpolation | float | Threshold beyond no interpolation is made | sec |
| $Err_H^{max}$ | float | Limit for an acceptable residual error | deg |
| $Err_{delay}^{max}$ | float | Limit for an acceptable residual error for time delay | sec |
| Harmonization uncertainty upper limit | float | Limit for an acceptable uncertainty for harmonization | deg |
| Interpolation mode | enum | choose common times the interpolators are evaluated | none |
| $f_{cut}$ | float | filter cutoff frequency | none |
| $f_s$ | float | length of averaging window | none |
| Output variables | Format | Description | Units |
| H | floatX3 | Harmonization angles (gyro2 in gyro1 axes) | deg |
| Time Delay | float | Time delay (gyro2 clock relative to gyro1 clock) | sec |
| Estimated harmonization uncertainty | float | quantifies expected statistical error for harmonization | none |
| $Err_H$ | float | Root mean square (RMS) of angle between angular velocities after Harmonization | deg |
| $Err_{delay}$ | float | RMS of differences between norms of angular velocities after Harmonization | deg |
| Bias difference | floatX3 | bias difference between signals | deg/sec |
| Harmonization variability | float | Variability in harmonization of different segments | deg |

In some exemplary embodiments, the problem addressed by the algorithm of the present discloser may be modeled. Two inertial navigation sensors, gyro1 and gyro2 are attached to the same platform. As an example, Sensor 134 and Sensor 132 to Display Unit 133 and HMD 130, of FIG. 1, respectively. Additionally, or alternatively, INS 211 and Sensor 241 to Platform 10 and TRU 140, of FIG. 2, respectively. The sensors measure the same angular velocity in different axes. $w_{gyro2}(t)=w_{gyro1}(t+\delta t)H+bias$.

In some exemplary embodiments, non-valid measurements may be discarded. The first step is evaluating only measurements that are valid, i.e., $Isvalid_1==Isvalid_2==1$.

In some exemplary embodiments, an interpolation object may be created. In this step both sets of angular velocities $w_{gyro}$ (angular rate signals) and time tags $t_{gyro}$ create an object that interpolates between different points. The interpolation is done in order to have the flexibility to evaluate the signal at any time. Interpolation may be for example a linear interpolation between any two samplings. The algorithm avoids interpolating through discontinuities. The next step is to calculate the signal at a given set of fixed times, with and without the delay. The fixed times are taken to be a set of times between the first-time-tag and last-time-tag of gyro1 with a spacing that is left as a control parameter. Only the overlapping part between the signal is considered. No extrapolation is made. Changing the interpolation mode enables taking the samplings of gyro1 or gyro2 as an alternative for the set of times.

In some exemplary embodiments, the bias may be subtracted by subtracting from the angular velocities the average, i.e., $w \to \tilde{w}=w-\langle w\rangle$. This removes the bias from the relation, assuming the bias is constant. Starting from the basic relation between the two angular velocities: $w_{gyro2}(t)=w_{gyro1}(t+\delta t)H+bias$. Averaging over time yields: $\langle w_{gyro2}(t)\rangle=\langle w_{gyro1}(t+\delta t)\rangle H+bias$ assuming the Harmonization and bias are constant through time. Subtracting the two relations gives: $\tilde{w}_{gyro2}(t)=\tilde{w}_{gyro1}(t+\delta t)H$ Where $\tilde{w}=w-\langle w\rangle$ and the bias is cancelled.

In some exemplary embodiments, a Low Pass Filter (LPF) may be applied for reducing noise at high frequencies. A Sinc LPF is applied to both signals, which has a vector of coefficients given by $$\frac{\sin(2\pi * fcut * \text{index})}{\pi * \text{index}}$$

where index is the index of the vector, $f_{cut}$ is the cut off frequency and $f_s$ is the length of the averaging window. The value of the index runs from $-f_s$ to $f_s$ and the number of coefficients is $2f_s+1$. This vector is applied to every window of the corresponding range in the matrix of angular velocities. These coefficients in time space are a sharp cut off in frequency space. This filter has no net effect on harmonization or bias.

Since the filter is a linear operation, it can be written as a matrix F applied on the signals: $Fw_{gyro2}(t)=Fw_{gyro1}(t+\delta t)H+Fbias$. However, using the associativity of matrix multiplication and normalization of the filter, provides: $Fw_{gyro2}(t)=(F \cdot w_{gyro1}(t+\delta t)H)+bias$. Thus, the same harmonization and bias are true for the filtered signals.

In some exemplary embodiments, a time delay may be estimated. The next step is to estimate the time delay between the signals. Time delay is estimated by minimizing this function with respect to $\delta t$: $F(\delta t)=\Sigma_i(|\tilde{w}_{gyro2}(t_i)|-|\tilde{w}_{gyro1}(t_i+\delta t)|^2/\text{length}(\tilde{w}))$. The function is evaluated with several steps:

a. The interpolator is used to evaluate a new array $w_{gyro1}$, once a new value of $St$ is given.
b. The new array is then subtracted from its mean, i.e., $\tilde{w}_{gyro1}(t)=w_{gyro1}-\langle w_{gyro1}\rangle$
c. A filter is then applied on the $\tilde{w}_{gyro1}$.
d. The sum above is then calculated.

The minimization algorithm then chooses the next value of $St$, until finally it reaches a minimum. The minimization is done using an iterative numerical algorithm, known as Powell.

In some exemplary embodiments, harmonization may be found by using a Singular value decomposition (SVD). SVD allows to write any matrix M as $M=U*S*V^T$, where U and V are orthogonal matrices and S is a diagonal matrix. The decomposition is done by diagonalizing the matrices $M*M^T$ and $M*M^T$. Thus, $M*M^T=U*S^2*U^T$ and $M^T*M=V*S^2*V^T$.

First, the Matrix $w_{gyro1}{}^T*w_{gyro2}$ is calculated. Then it is decomposed using SVD $w_{gyro1}{}^T*w_{gyro2}=U*S*V^T$. The Harmonization is then calculated by $H=U*V^T$. It is important to note that the algorithm is formulated with the Harmonization operating from the right side on the angular velocity vectors, however the harmonization is afterwards realized using a left side convention. Therefore, the transpose of this harmonization is returned.

In some exemplary embodiments, uncertainty of extracted quantities may be estimated. The uncertainty is estimated using the noise and observability. It is calculated as noise*det$([I \cdot T_r+(w_{gyro1}{}^T w_{gyro1})-w_{gyro1}{}^T w_{gyro1}])^{-1/6}$, where $T_r$ is a shortcut for trace and the noise is taken to be the average difference between the norms of the angular velocities after filter and time delay implementation: noise=$\Sigma_i(|\tilde{w}_{gyro2}(t_i)|-|\tilde{w}_{gyro1}(t_i+\delta t)|)/N$, where N is the number measurements in the array.

In some exemplary embodiments, a residual error may be estimated. Specifically, estimating how good, the sets of angular velocities are aligned after harmonization, a residual error is calculated both for harmonization and time delay. First, the angle between each pair of angular velocities is calculated after harmonization, time delay and filter. To calculate this, the mean of cos $$\alpha = \frac{w_{gyro1} \cdot w_{gyro2}}{|w_{gyro1} \cdot w_{gyro1}|}$$

is calculated. Then, harmonization residual error is defined as: $\text{Err}_{delay}{}^{max}=\sin\alpha=\sqrt{(1-\cos\alpha^2)}$. The residual error for the time delay is: $\text{Err}_{delay}{}^{max}=\sqrt{\Sigma_i(|\tilde{w}_{gyro2}(t_i)|-|\tilde{w}_{gyro2}(t_i+\delta t)|^2)^2}$ The mean and typical value of both residual errors is calculated and compared with their upper limits.

In some exemplary embodiments, the bias difference may be estimated. After finding the harmonization, the relative bias is given by: bias=$\langle w_{gyro2}(t)\rangle - \langle w_{gyro1}(t+\delta t)\rangle H$ which in terms of the individual biases is equal to bias$_2$–bias$_1 \cdot$H. If the reference gyro has approximately bias$_1$=0, then it is equal to the bias of the target gyro.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

What is claimed is:

1. A tracking system between coordinates of a platform, having an inertial-sensor, and coordinates of a tracking apparatus comprising a tracking-reference-unit (TRU) and a tracking module coupled to a head-mounted-device, the system comprising:
at least one TRU-inertial-sensor attached to the TRU; and
a processor configured to receive information indicative of orientation of the head-mounted-device relative to the TRU from the tracking apparatus; and inertial information of the inertial-sensor and said at least one TRU-inertial-sensor, wherein said processor utilizes the inertial information to dynamically calculate a transfer-alignment between the TRU's TRU-inertial-sensor and the platform's inertial-sensor in a coordinate system of the platform, and wherein the tracking apparatus utilizes the transfer-alignment to continually compensate the information indicating the relative orientation of the head-mounted-device relative to the platform.

2. The system of claim 1, wherein the head-mounted-device comprises at least one element selected from the group consisting of a display; at least one sensor; and any combination thereof, wherein the head-mounted-device is worn by a user operating the platform, and wherein the at least one element is conformal to coordinates selected from the group consisting of platform's coordinates; earth coordinates; and any combination thereof.

3. The system of claim 2, wherein the head-mounted-device comprises a see-through display displaying to the user an augmented reality or virtual reality view comprised of scenes external to the platform and images that are conformal to at least one external scene and the platform.

4. The system of claim 3, wherein the images are selected from the group consisting of graphical symbology; thermal images; text; video; synthetically generated images; and any combination thereof.

5. The system of claim 1, wherein said at least one TRU-inertial-sensor is an inertial measurement unit selected from the group consisting of at least one accelerometer; angular rate sensors; gyroscopes; and any combination thereof.

6. The system of claim 1, wherein the tracking apparatus is selected from the group consisting of an electro-optical-base tracking apparatus; an electromagnetic-base tracking apparatus; and a combination thereof.

7. The system of claim 1, further comprises a plurality of inertial measurement units coupled to a plurality of modules of the platform, wherein said processor further acquires angular rates from said plurality of inertial measurement units for enhancing accuracy of the calculated transfer-alignment.

8. A transfer-alignment method using the system of claim 1, the method comprising:
   receiving one first inertial sensor from said at least one inertial TRU-sensor and the inertial-sensor;
   receiving information indicating the orientation and position of the HMD from the tracking apparatus;
   utilizing a transfer alignment algorithm for dynamically calculating a relative orientation between the TRU and the platform's coordinates and continually compensating said information indicating the orientation and position of the head-mounted-device.

* * * * *